United States Patent
Schermutzki et al.

(10) Patent No.: US 6,510,941 B2
(45) Date of Patent: Jan. 28, 2003

(54) DEVICE FOR SEALING LATERAL EDGE AREAS OF AN ENDLESS CONVEYOR BELT

(75) Inventors: Konrad Schermutzki, Remseck (DE); Matthias Kleinhans, Waiblingen (DE)

(73) Assignee: Santrade Ltd., Lucerne (CH)

(*) Notice: Subject to any disclaimer, the term of this patent is extended or adjusted under 35 U.S.C. 154(b) by 6 days.

(21) Appl. No.: 09/851,143

(22) Filed: May 9, 2001

(65) Prior Publication Data

US 2002/0005273 A1 Jan. 17, 2002

(30) Foreign Application Priority Data

May 12, 2000 (DE) .......................... 100 23 325

(51) Int. Cl.[7] .............................................. B65G 15/60
(52) U.S. Cl. .................... 198/836.1; 198/493; 198/500; 198/805; 198/837; 198/841
(58) Field of Search ................. 198/690.1, 805, 198/836.1, 837, 841, 493, 500, 495

(56) References Cited

U.S. PATENT DOCUMENTS

| | | | |
|---|---|---|---|
| 2,124,233 A | 7/1938 | Martin | |
| 3,669,238 A | * 6/1972 | Folkes et al. | 101/232 |
| 4,819,790 A | 4/1989 | Adcock | |
| 5,277,246 A | 1/1994 | Mönch | |
| 6,102,191 A | * 8/2000 | Janzen et al. | 198/689.1 |
| 6,106,388 A | * 8/2000 | Green | 198/837 |

FOREIGN PATENT DOCUMENTS

| | | |
|---|---|---|
| DE | 41 35 613 A | 5/1993 |
| DE | 195 28 816 | 12/1996 |
| DE | 196 14 741 C | 7/1997 |
| EP | 0 325 333 A | 7/1989 |
| FR | 2 763 319 A | 11/1998 |

* cited by examiner

Primary Examiner—Khoi H. Tran
(74) Attorney, Agent, or Firm—Burns, Doane, Swecker & Mathis, LLP

(57) ABSTRACT

An endless conveyor belt has a thermal fluid (gas or liquid) sprayed against a portion of its underside to define a temperature-controlled region of the belt. To prevent the lateral escape of the thermal fluid, stationary seals are provided which contact the belt underside adjacent respective longitudinal edges of the belt. To keep the seals in continuous contact with the belt, despite warping that might occur, the seals carry magnets, and the belt is formed of a magnetizable material. Hence, the magnets force the belt and seals together.

18 Claims, 6 Drawing Sheets

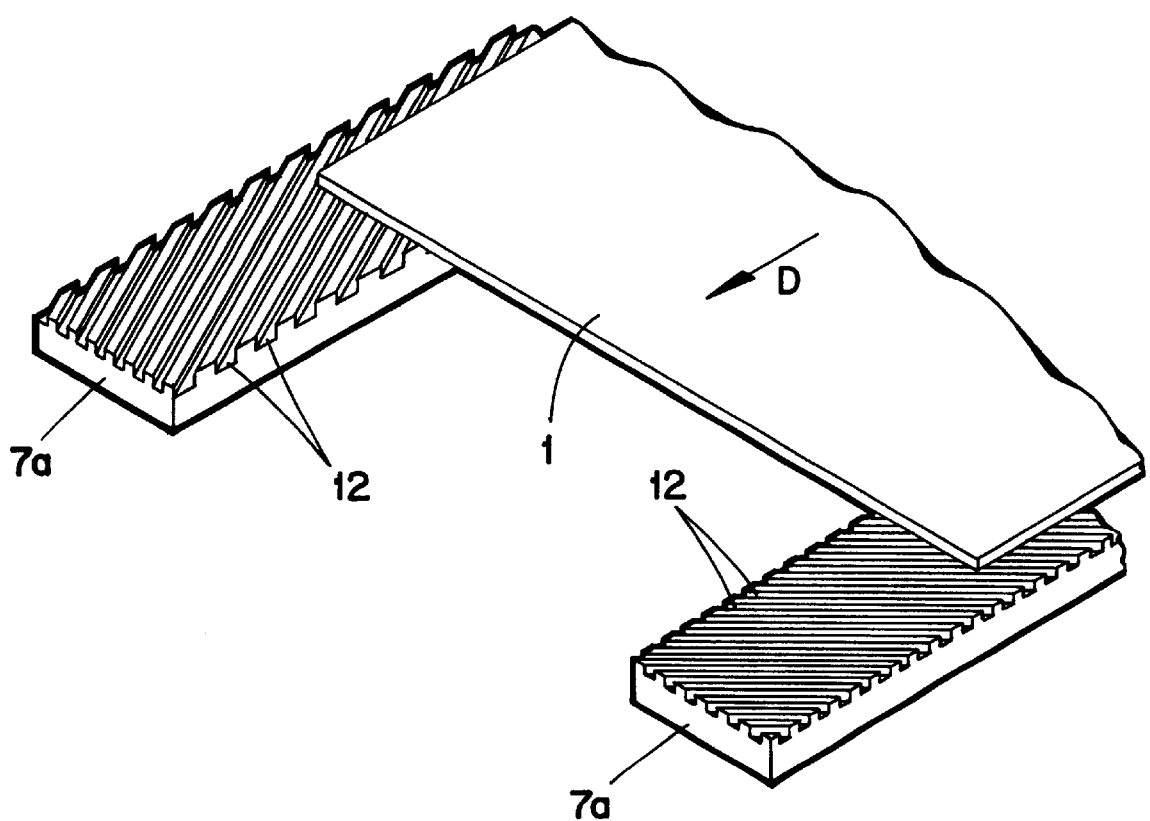

DEVICE FOR SEALING LATERAL EDGE AREAS OF AN ENDLESS CONVEYOR BELT

BACKGROUND OF THE INVENTION

This application is based on and claims priority under 35 U.S.C. §119 with respect to German Application No. 100 23 325.2 filed on May 12, 2000, the entire content of which is incorporated herein by reference.

The invention relates to a device for sealing edge areas of an endless, running conveyor belt made of magnetizable material, particularly steel, against which a liquid or gaseous heat exchange medium effects the backside of the belt in the area of a temperature-controlled section. The conveyor belt has at least one interconnected seal arrangement arranged adjacent each lateral edge area and along at least the length of the temperature-controlled section.

U.S. Pat. No. 5,277,246 discloses a running conveyor belt made of steel. In the area of a temperature-controlled section of the conveyor belt, for instance a cooling section, cooling water is sprayed as a heat exchange medium against the underside of the belt whereby products disposed on the belt surface may be cooled. To prevent transverse escaping of the cooling water past the downwardly facing longitudinal edges of the conveyor belt, which could moisten the belt surface in an undesirable manner, seal arrangements in the form of stationary sealing strips are arranged along the longitudinal edge areas of the conveyor belt whereby the longitudinal edge areas of the conveyor belt rest slidably against said sealing strips. The top surfaces of the sealing strips facing the longitudinal edge areas of the conveyor belt are provided with diagonally running grooves. Thereby there is prevented, on one hand, an escape of cooling fluid from the sides of the conveyor belt. On the other hand, cooling fluid adhering to the underside of the belt is returned to the inside by a hydrodynamic action based on the belt movement whereby the need for additional sealing measures is avoided. The sealing strips with their grooves are characterized therefore as hydrodynamic water guides.

It is the object of the invention to further improve the sealing of the underside of a conveyor belt.

SUMMARY OF THE INVENTION

This object is achieved in that a magnet structure is provided adjacent at least one of the longitudinal edges for attracting the belt and the respective seal structure together. Preferably, a magnet structure is attached to each seal structure, which magnet structure exerts a uniform attraction force against the conveyor belt along the entire length of the temperature control section. This solves a problem involving thermal or mechanical warping which results in undulated edges on the conveyor belt, whereupon there is no longer a sufficient sealing function. By means of the additionally created magnetic force, it is possible according to the invention, to guarantee sealing of the longitudinal edge areas of the underside of the belt and even in the area of such undulations on the edge of the belt. A continuous seal arrangement may thereby be provided along the entire processing length on each side of the belt, respectively. Alternatively, the respective seal arrangement may extend only along the whole length of the respective temperature-controlled section.

In particular, there may be provided a continuous seal arrangement at each side of the belt, respectively, while an additional seal arrangement is provided for a first cooling or heating section at each side of the belt along the length of an additional cooling or heating section and adjacent to the first cooling or heating section. The entire processing length of the conveyor belt defines the total length of the respective belt strip between a front and a rear return roller for the conveyor belt.

In an embodiment of the invention, each seal arrangement can be designed with diagonally running grooves in the top surface facing the underside of the belt to define a hydrodynamic water guide. In this embodiment, the inventive solution is combined with the solution disclosed in U.S. Pat. No. 5,277,246 whereby further improved sealing is achieved.

At least one seal arrangement may be basically designed in a manner already known from the (current) state-of-the-art. However, especially suitable for the inventive solution are seal arrangements which provide a good support function for the longitudinal edge areas by a somewhat larger bearing surface for said edge areas since the magnetic force of at least one magnet unit may be practically employed only then when at the same time a secure, wide and uniform belt support is available.

In an additional embodiment of the invention, the seal arrangement is provided with at least one channel for guidance of a heat exchange medium for active temperature control for the sidewall areas of the conveyor belt. Especially advantageous is a seal arrangement made of heat-conducting material to achieve a good heating or cooling temperature for the edge areas of the conveyor belt.

In a further embodiment of the invention, the magnet unit is made of a plurality of magnet elements oriented longitudinally in the direction of the belt movement whereby said magnet elements are arranged in a row, one behind the other along the seal arrangement. Cube-shaped or block-shaped magnetic elements may be provided as permanent magnets therefor, for example, so that simple assembly is made possible.

In an additional embodiment of the invention, the magnet unit has at least one electromagnet. This embodiment has the advantage that there is no permanent magnetic effect—only a magnetic effect according to demand.

In an additional embodiment of the invention, the magnet unit is designed to provide a variable magnetic force so that magnetic forces of varying size may act upon the conveyor belt. Thereby, the necessary magnetic force may be variably adjusted according to the corresponding belt dimensions and to the size of the undulations of the belt edges.

In an additional embodiment of the invention, the magnet unit is positioned by means of a height adjustment device in the seal arrangement. Thereby it is possible to employ permanent magnet elements and still exert magnetic forces of varying magnitude onto the conveyor belt.

In an additional embodiment of the invention, at least one electromagnet is connected to a control unit, which controls the electromagnet electrically or electronically in such a manner that said electromagnet exerts magnetic forces of varying magnitude against the conveyor belt. These electric or electronic solutions may be advantageously coupled with belt controls so that a dependence of magnetic forces is made possible in relation to the running belt speed, the belt temperature, or other reference quantities of the belt structure.

In an additional embodiment of the invention, a demagnetizing device is arranged in the direction of the belt movement and behind the temperature-controlled section of the conveyor belt. By demagnetizing the belt, there is less tendency for the belt to magnetically attract metallic particles in the air which could build-up on and foul the belt. The demagnetizing device may be disposed exclusively at the level of the edge areas of the conveyor belt and could take the place of at least one downstream magnet unit. The demagnetizing device may be disposed either directly behind a temperature-controlled section, in the area of the belt discharge area, or also in the area of the returning belt section.

BRIEF DESCRIPTION OF THE DRAWING FIGURES

Additional advantages and characteristics of the invention are shown in the claims as well as in the following description of preferred embodiment examples of the invention that are illustrated with the aid of the drawings.

FIG. 12 shows a top perspective view of the embodiment according to FIG. 3 in order to show the diagonal nature of grooves formed in a seal arrangement.

DETAILED DESCRIPTION OF PREFERRED EMBODIMENTS OF THE INVENTION

Figure 1:
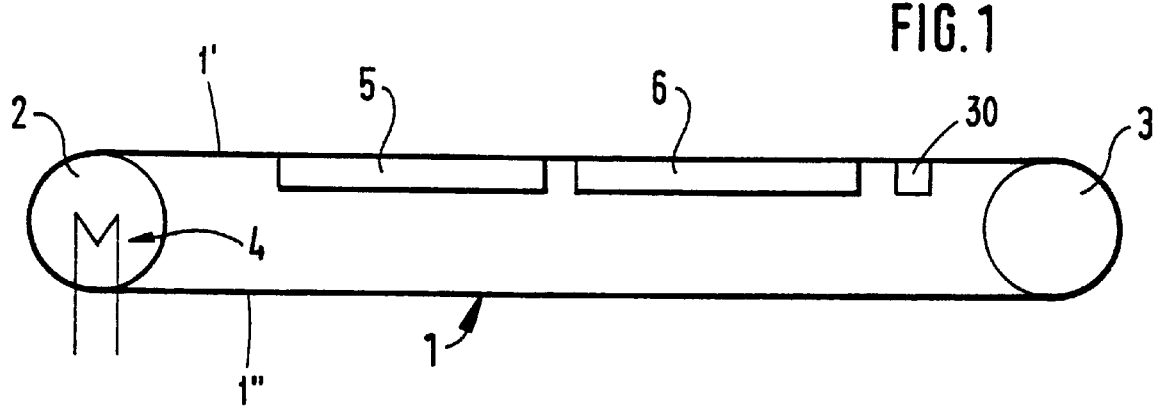
FIG. 1 shows schematically in a side view an endless conveyor belt running around two return rollers whereby said belt has two temperature-controlled zones.

A conveyor belt 1 according to FIG. 1 is an endless running steel belt that returns in the area of a feed roller 2 and in the area of a discharge roller 3. The front return roller 2 (relative to the direction of belt movement) is provided with a heating device 4 so that the steel belt 1 may be heated in the area of the feed roller 2. Both return rollers 2, 3 are not further illustrated; however, they are basically rotatably mounted in a stationary supporting frame in a known manner whereby at least one return roller 2, 3 is provided with a drive. The belt includes an upper flight 1' and a lower flight 1". The supporting frame, which extends over the entire length of the conveyor belt 1, is equipped with two temperature control devices 5, 6 (not further illustrated) which in turn respectively define a temperature-controlled section along a particular belt length of the conveyor belt 1 in an area of the upper flight (carrying run) of the belt at which there is achieved heating or cooling or conditioning of the belt surface to a defined temperature. Temperature control devices of this type may be designed in a manner as described in U.S. Pat. No. 5,277,246, the disclosure of which is incorporated herein by reference. The temperature control devices 5, 6 are preferably disposed underneath the upper flight of the belt and are directed against the underside of the belt. The temperature control devices 5, 6 are provided with spray nozzles, which spray against the underside of the belt and preferably distribute uniformly a cooling or heating medium in the form of water or steam along the length of the temperature-controlled section and cross almost the entire width. This is illustrated schematically in FIG. 2 and also in FIG. 5. To prevent lateral escape of the heat exchange medium past the two longitudinal edge areas of the conveyor belt 1, whereby the medium would undesirably moisten the belt upper surface, there is now provided a seal arrangement 7 at both sides of the belt adjacent the longitudinal edge area; said seal arrangement is attached to the supporting frame in any suitable manner not further illustrated. Lateral splash walls (not shown) are additionally provided underneath the seal arrangement 7 at least in the area of the temperature-controlled section 5, 6, which prevent the lateral escape of heat exchange medium underneath the seal arrangement 7. The basic arrangement of these seal arrangements 7, which are also called seal strips, and the corresponding splash walls located underneath are also known from U.S. Pat. No. 5,277,246, reference being made to that patent for further description. The seal arrangement 7 may correspond to the sealing strips in terms of the basic design as they are known from U.S. Pat. No. 5,277,246. The seal arrangements 7 are preferably made of synthetic material. However, they may be made in the same way of metal or wood.

The seal arrangements 7 have a relatively wide upper surface and extend continuously at least along the length of at least one temperature-controlled section. Alternatively, each seal arrangement 7 may extend along the entire processing length of the conveyor belt 1 between the two return rollers 2, 3. The seal arrangement 7 forms an uninterrupted bearing surface for the edge areas of the conveyor belt 1. To prevent the development of leakage between the seal arrangement 7 and the edge areas of the underside of the conveyor belt because of undulations formed at the belt edge due to thermal or mechanical warping, magnet units 8 are spatially integrated into the seal arrangements 7 adjacent the edge areas of the conveyor belt 1. Said magnet units 8 extend preferably also along the entire length of the respective seal arrangements 7. Said magnet units may thereby extend uninterruptedly along the length of the seal arrangement 7, or they may extend non-continuously, i.e., in the form of several magnetic elements arranged in a row, one behind the other, and positioned at a small distance from one another. In the following description, permanent magnets are described, but they could instead comprise electromagnets having corresponding electric or electronic controls to control the magnetic forces of the electromagnets.

Figure 2:
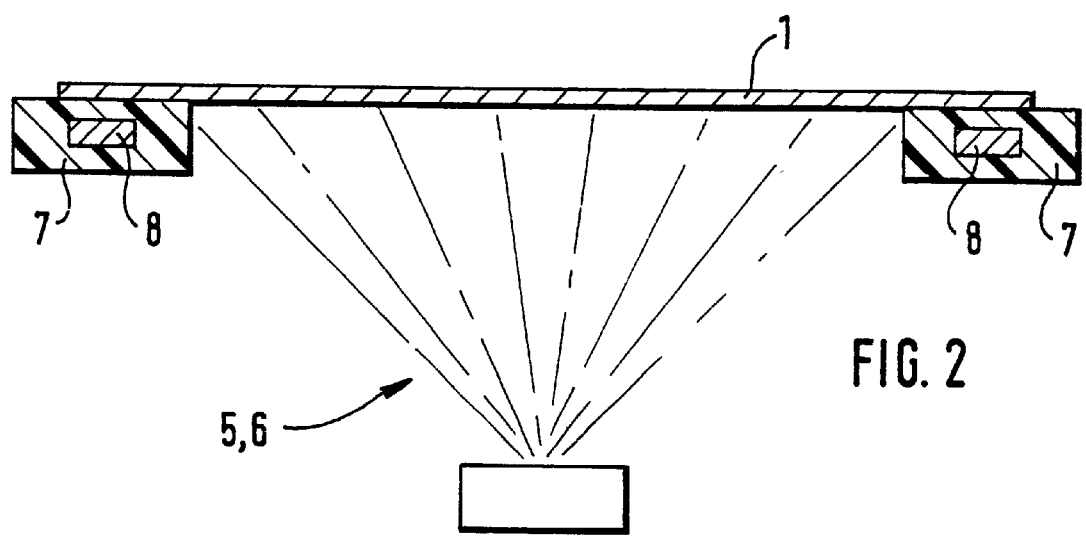
FIG. 2 shows in an enlarged schematic illustration a cross section through the conveyor belt in FIG. 1 whereby one embodiment in an innovative device is illustrated for sealing the longitudinal edge area of a conveyor belt.
Figure 3:
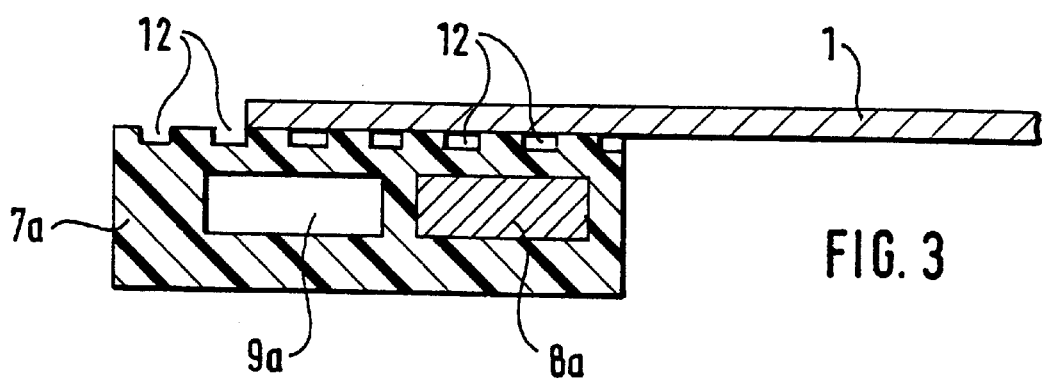
FIG. 3 shows in a further enlarged illustration an additional embodiment of a sealing device similar to FIG. 2.

In the embodiment example according to FIG. 3, a seal arrangement 7a is provided that corresponds to the seal arrangement 7 in FIG. 2 in terms of the basic design and installation. However, this seal arrangement 7a is provided complimentary for active temperature control of the edge areas of the conveyor belt 1. Hereby, the seal arrangement 7a is provided with a hollow section made of heat-conducting material, preferably metal, whereby there is provided a flow channel 9a for a heat exchange medium disposed laterally and outwardly adjacent to a magnet unit 8a embedded in a corresponding hollow space of the seal arrangement 7a. The flow channel 9a is connected to a separate temperature control circuit, which serves especially in the proper temperature control of the edge areas of the conveyor belt 1. Thereby it is guaranteed that in these edge areas, in which no product is being carried to a large extent, the best possible constant temperature is achieved in comparison to the center of the belt, so that there are almost no differences in temperature across the with of the conveyor belt. Alternatively, temperature differences across the width may be deliberately obtained with this active temperature control, relative to the center of the belt, to let the edge areas of the applied product harden more rapidly, for example.

Figure 4:
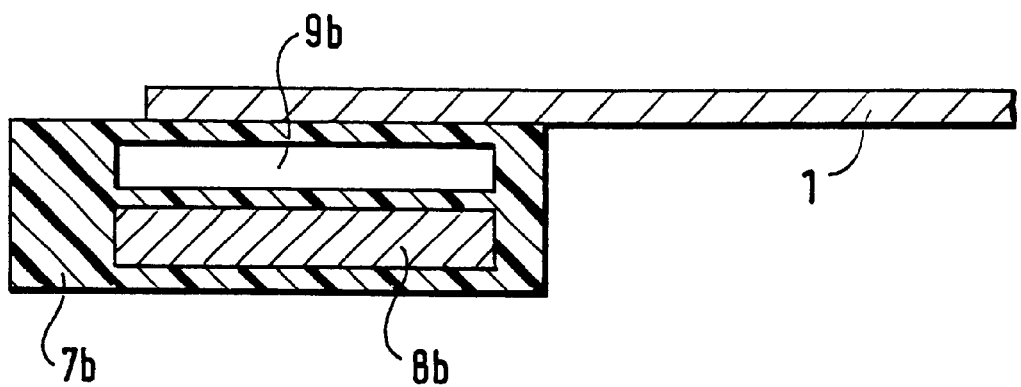
FIG. 4 shows an additional embodiment of a sealing device similar to FIG. 3.

In the embodiment example according to FIG. 4, a seal arrangement 7b is also provided for active temperature control of the respective edge areas of the conveyor belt 1. However, there the flow channel 9b provided for the heat exchange medium of the added temperature control circuit is above the hollow space for the magnet unit 8b.

In the embodiment example according to FIG. 3, the upper surface of the seal arrangement 7a facing the underside of the belt is additionally provided with grooves 12 running diagonally toward the center of the conveyor generally in the direction of belt travel D (see FIG. 12), whereby the seal arrangement 7a additionally functions as a hydrodynamic water guide as explained in U.S. Pat. No. 5,277,246. Stated in another way, the direction of each groove has a component extending in the direction of belt travel and a component extending toward a midline of the belt. The shape and alignment of the grooves 12 may be provided in various embodiments as described in that patent.

Figure 5:
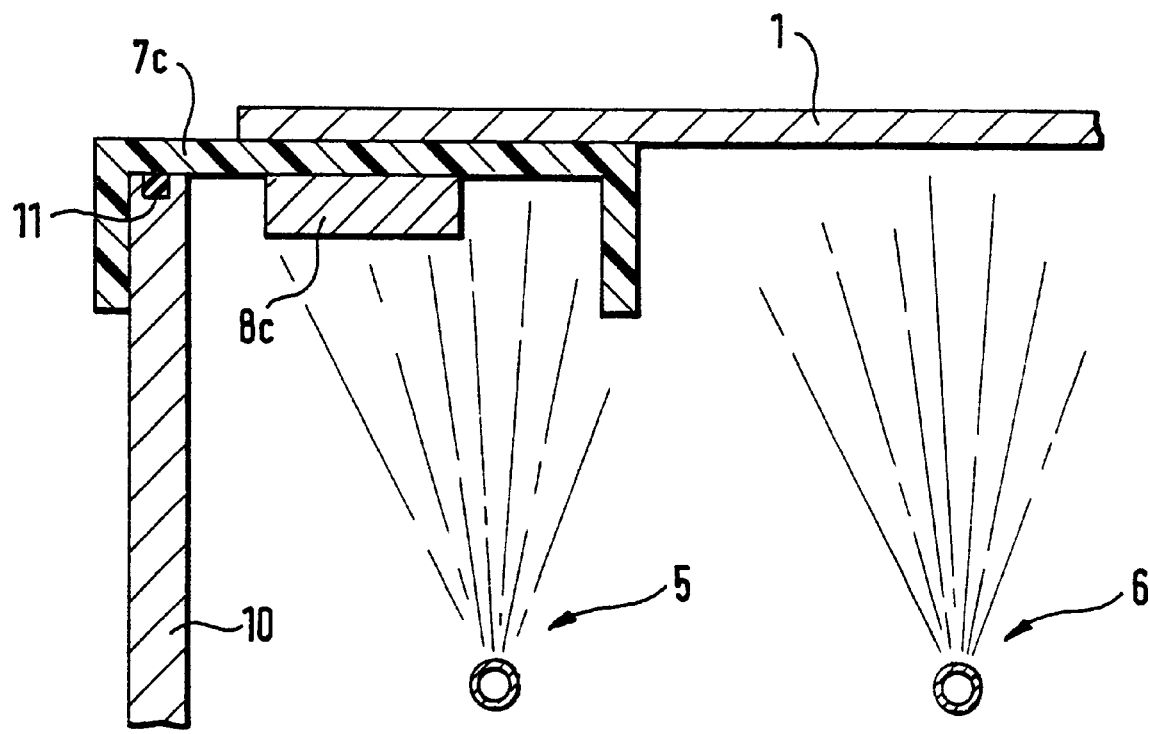
FIG. 5 shows an additional embodiment of a sealing device for a conveyor belt according to FIG. 2.

In the embodiment example according to FIG. 5, a seal arrangement 7c arranged in the area of the underside of the edge area of the conveyor belt 1 is shaped like an upside-down "U", open at the bottom. Within the seal, a magnet unit 8c is arranged in form of a single permanent magnet strip or in the form of a plurality of permanent magnets arranged in a row, one behind the other. A splash wall 10 is attached in the area of the outer leg of the "U" (oriented downwards) of the seal arrangement 7c. Said splash wall fits inside against said leg of the "U" and forms a leak-proof closure with its upper edge engaging a flexible seal 11.

Figure 6:
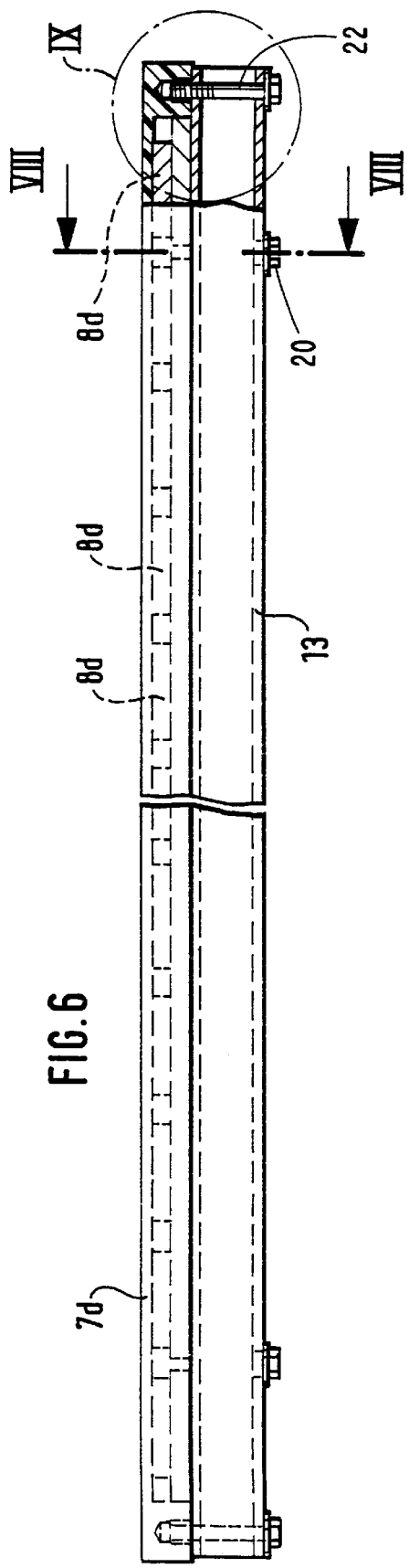
FIG. 6 shows a side view of a seal arrangement for a sealing device similar to FIG. 2.
Figure 7:
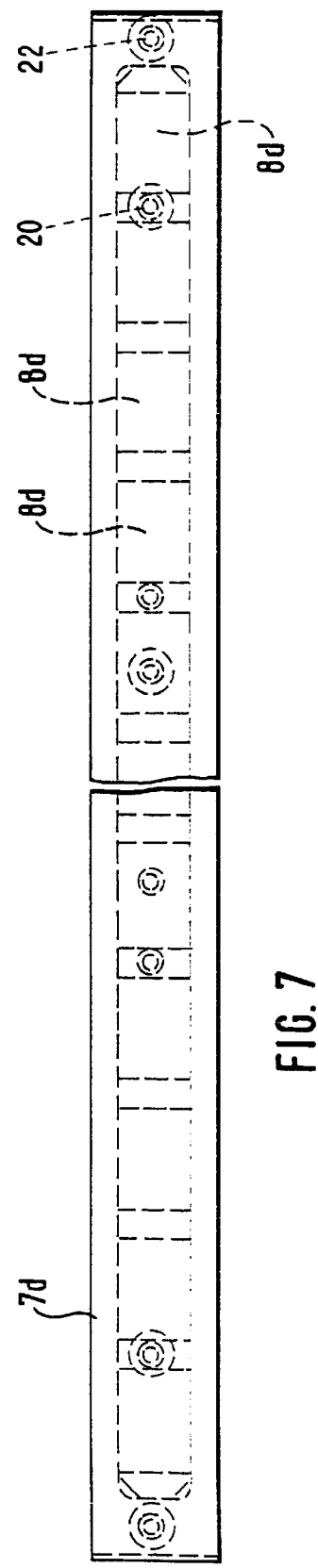
FIG. 7 shows a top view of the seal arrangement according to FIG. 6.

A seal arrangement 7d illustrated in FIGS. 6 and 7 is designed similarly to the seat arrangement 7 according to FIG. 2, in that it extends continuously along the entire length of a temperature-controlled section of a conveyor belt (not further illustrated). The seal arrangement 7d has a support profile 13 designed in a square and hollow profile, which is firmly connected to the supporting frame of the conveyor belt in a manner not further illustrated. The support profile 13 supports the actual seal profile 7d made of synthetic material as well as a holding strip 14, which in turn is integrated in a hollow space that runs almost along the entire length of the seal profile 7d. The holding strip 14 carries a plurality of square permanent magnet elements 8d, which are arranged in a row, at equal distances, and one behind the other in the hollow space of the seal profile 7d. The permanent magnet elements 8d may be glued to the holding strip 14 or held in place exclusively by clamping between the holding strip 14 and the seal profile 7d. The fastening and securing of the seal profile 7d as well as the holding strip 14 on the support profile 13 is accomplished via the illustrated screws 20, 22. The screws 22 for securing the seal profile 7d to the support profile 13 are provided with holding sleeves 24 integrated into the seal profile 7d to achieve improved fastening of the plastic seal profile 7d to the support profile 13. The thereby formed seal arrangement may be pre-assembled as one unit and mounted in this pre-assembled layout, according to FIGS. 6 through 9, to the supporting frame for the conveyor belt at the level of the respective edge area of the upper flight of the conveyor belt.

Figure 8:
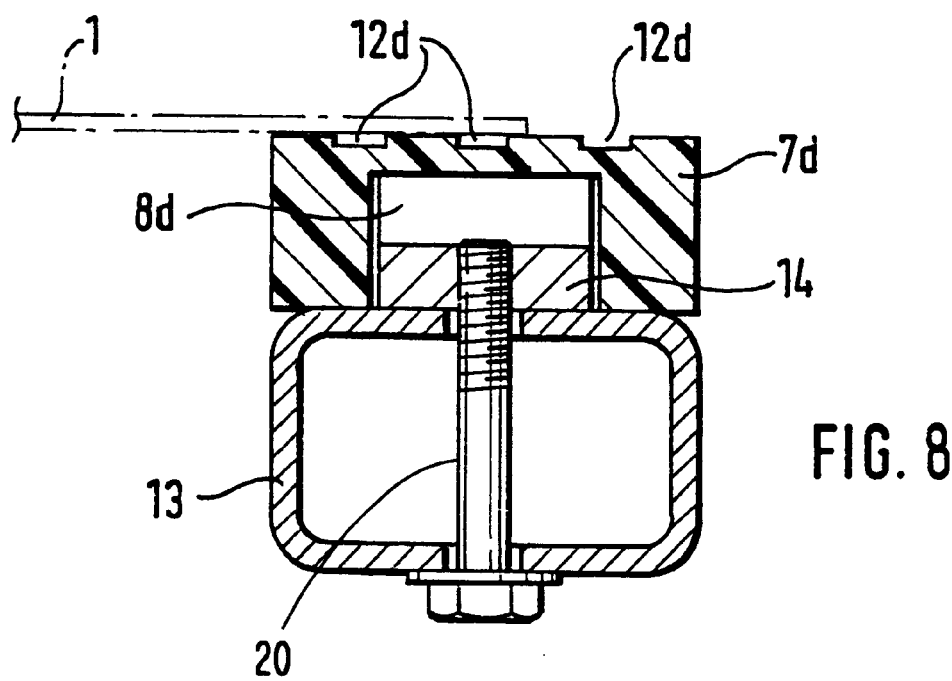
FIG. 8 shows a cross section through the seal arrangement according to FIG. 6 taken along the sectional line VIII—VIII in FIG. 6.
Figure 9:
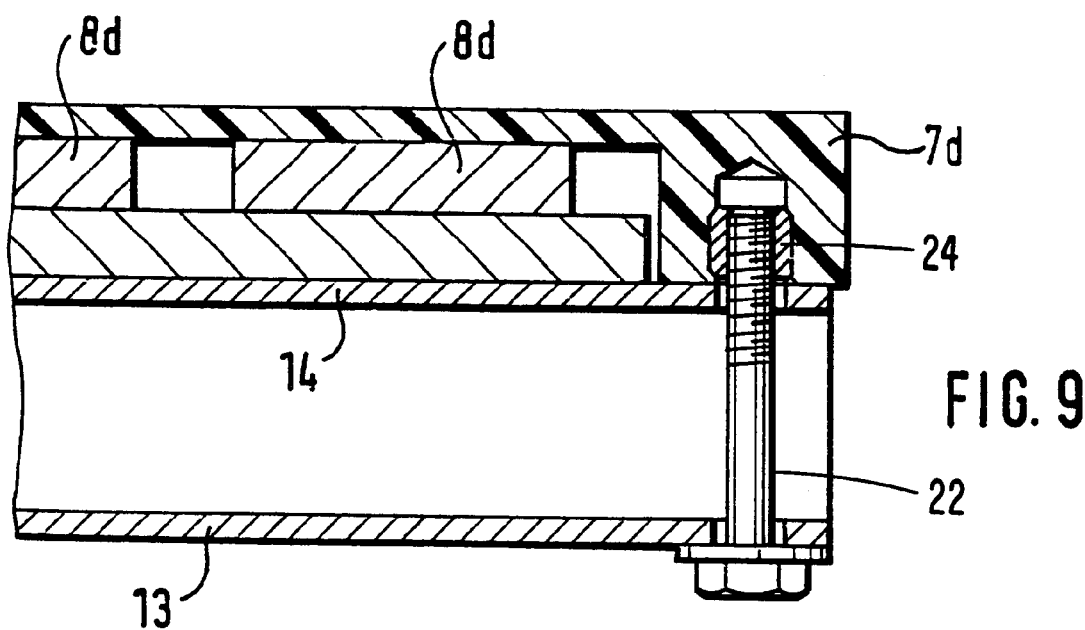
FIG. 9 shows an enlarged cutout IX of the seal arrangement according to FIG. 6.

As can be seen in FIG. 8, the upper surface of the seal profile 7d is provided with diagonal, inwardly running grooves 12d, which have a hydrodynamic function according to the embodiment example in FIG. 3.

Figure 10:
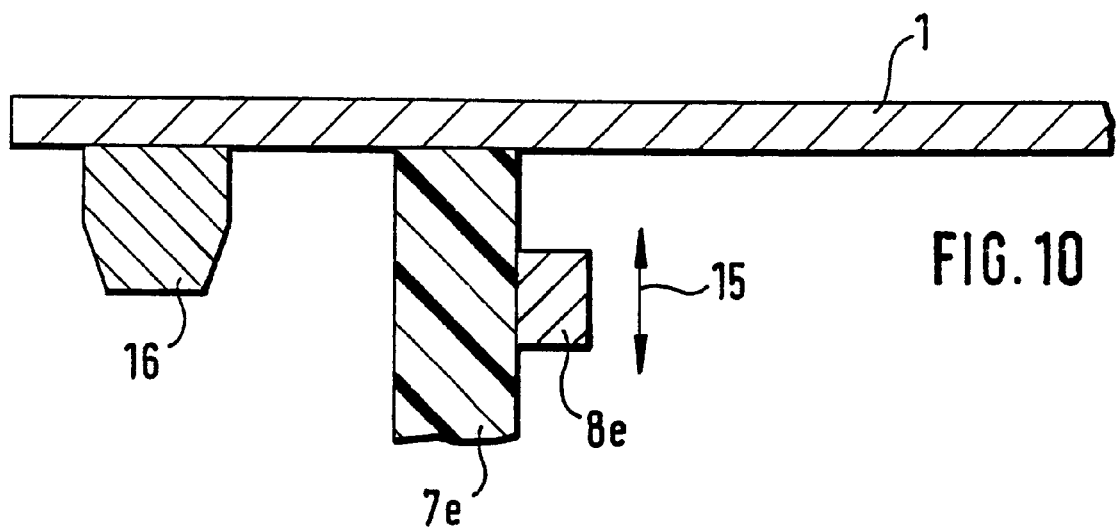
FIG. 10 shows in an enlarged schematic illustration an additional embodiment of a sealing device according to the invention whereby a height-adjustable magnet unit is attached to a seal arrangement.

In the embodiment example according to FIG. 10, the conveyor belt 1 is supported at its edge areas and along the entire length of its temperature-controlled section by a seal arrangement 7e. In addition, a draining profile 16 is attached to the underside of the belt, laterally outside of the belt support which is in the form of the seal arrangement 7e. Such a draining profile 16 serves as a drip edge for the water adhering to the underside of the belt. A draining profile 16 of this type, which runs along the underside of the belt, has a (water) collection channel arranged on the supporting frame (not illustrated) whereby said collection channel may possibly be a one-piece extension of the seal arrangement 7e. In the embodiment example according to FIG. 10, a magnet unit 8a is arranged on the inwardly-facing surface of the seal arrangement 7e whereby said magnet unit is mounted on the seal arrangement 7e by means of any suitable height adjustment device (not shown) so that it may be adjusted in a vertical direction 15 by a selected distance relative to the underside of the conveyor belt 1. By such adjustment, the magnitude of the magnetic force acting against the belt can be varied. Alternatively, the magnetic force magnitude can be varied by employing a variable-force electromagnet. The magnet unit 8e may be formed by a single permanent magnet strip running uninterruptedly along the entire length of the seal arrangement 7e or it may be formed of permanent magnet elements arranged in a row, at a distance from one another, and which are then preferably arranged on mutual supports to simplify the mutual height adjustment via respective height adjustment devices.

Figure 11:
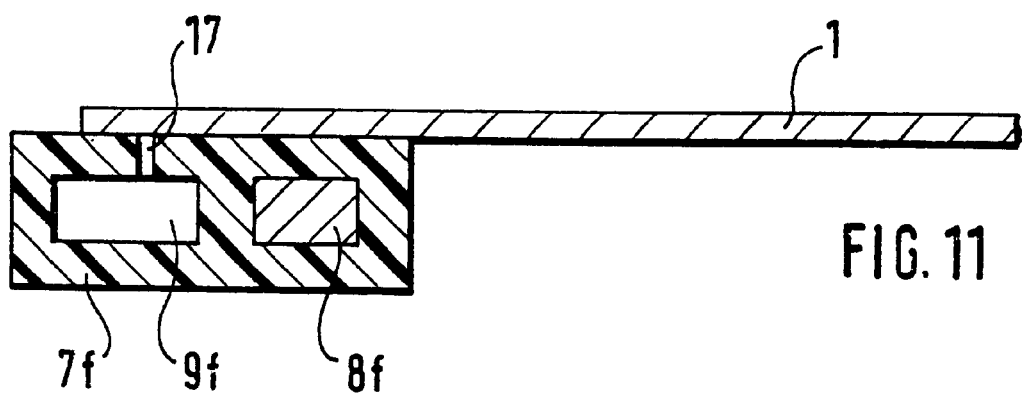
FIG. 11 shows an additional embodiment similar to FIG. 3 having in addition a suction feature.

A device for sealing the edge areas of an endless, running conveyor belt 1 according to FIG. 11 corresponds substantially to the above-described embodiment according to FIG. 3. A magnet unit 8f is here also spatially integrated within the seal arrangement 7f. Outwardly of the magnet unit 8f, there is provided a flow channel 9f corresponding to the flow channel according to FIG. 3, which creates a vacuum between the underside of the belt 1 and the surface of the seal arrangement 7f, particularly in the area in which the edge area of the conveyor belt I rests against the surface of the seal arrangement 7f. Thereby it is made possible to remove vapors or gasses by suction, which may tend to diffuse to the outside through gaps formed between the conveyor belt 1 and the surface of the sealing arrangement 7f. For transmitting the suction, there are functionally provided small borings 16 spaced apart in a longitudinal direction of the seal arrangement 7f, preferably spaced apart by 50 mm, and they are arranged one behind the other and extend to the surface of the seal arrangement 7f from the flow channel 9f. By means of said small borings 17, which serve as suction channels, and by means of a corresponding pumping device which creates negative pressure in the flow channel 9f, all types of possible escaping vapors or gasses may be captured and removed by suction from gaps formed between the conveyor belt I and the seal arrangement 7f. This is especially advantageous in the case of capturing so-called exhaust vapors, which refers to contaminating or hazardous vapors that may harm the environment or the (belt) operator. This suction device is especially advantageous when hydroscopic products are being conveyed and treated on the conveyor belt 1 since small quantities of moisture may lead to a harmful change in the properties of the product. Through the suction action in the area of the seal arrangement 7f, water vapors, mixed vapors, or exhaust vapors are prevented from escaping to the outside and already influencing the product.

A stationary belt-demagnetizing device 30 (FIG. 1) can be positioned at a location downstream of the sealing structures. By demagnetizing the belt, there is less tendency for the belt to magnetically attract metallic particles suspended in the air, which could foul the belt.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A conveying apparatus comprising:
   an endless belt formed of magnetizable material and defining a backside against which a heat exchange medium is directed to define a temperature-controlled section of the belt, the belt including two laterally spaced longitudinally extending edges;
   a seal structure situated adjacent at least one of the two longitudinally extending edges of the belt for sealing against the escape of the heat exchange medium, the seal structure extending continuously along at least the temperature-controlled section; and
   a magnet structure mounted adjacent the one longitudinally extending edge for generating magnetic forces attracting the belt toward the seal structure.

2. The conveying apparatus according to claim 1 wherein the magnet structure is mounted on the seal structure disposed adjacent the one longitudinal edge.

3. The conveying apparatus according to claim 1 wherein there is a seal structure adjacent each longitudinal edge of the belt, there being a said magnet structure adjacent each of the longitudinal edges for generating a magnetic force attracting the belt against the respective seal structure.

4. The conveying apparatus according to claim 2 wherein the heat exchange medium comprises a liquid.

5. The conveying apparatus according to claim 2 wherein the heat exchange medium comprises a gas.

6. The conveying apparatus according to claim 2 wherein the magnet structure is encased within the seal structure.

7. The conveying apparatus according to claim 2 wherein the seal structure includes an upper belt-engaging surface having longitudinally spaced grooves extending in a diagonal direction having a component extending in a direction of belt travel and a component extending in a direction toward a centerline of the belt.

8. The conveying apparatus according to claim 2 wherein the seal structure is provided with an internal channel for conducting heat exchange medium.

9. The conveying apparatus according to claim 2 wherein the magnet structure comprises a longitudinally extending row of separate magnets.

10. The conveying apparatus according to claim 2 wherein the magnet structure comprises at least one permanent magnet.

11. The conveying apparatus according to claim 2 wherein the magnet structure comprises at least one electromagnet.

12. The conveying apparatus according to claim 2 including adjusting means for varying a magnitude of a magnetic force applied by the magnet structure against the belt.

13. The conveying apparatus according to claim 2 wherein the magnet structure is vertically adjustable relative to the belt to vary a magnitude of the magnetic force applied to the belt.

14. The conveying apparatus according to claim 12 wherein the magnet structure comprises at least one variable electromagnet.

15. The conveying apparatus according to claim 2 further including a downwardly extending splash wall attached to the seal structure.

16. The conveying apparatus according to claim 2 wherein the seal structure includes an upper belt-engaging surface, and an inner suction channel communicating with the upper surface for suctioning away fluids attempting to escape through gaps formed between the upper surface and the belt.

17. The conveying apparatus according to claim 2 further including a demagnetizing device arranged to demagnetize the belt at a location downstream of the temperature-controlled section.

18. A conveying apparatus comprising:
   an endless belt formed of magnetizable material and including upper and lower flights, an underside of the upper flight having two laterally spaced longitudinally extending edges,
   a sprayer for directing a heat exchange medium against the underside of the upper flight to define a temperature-controlled section of that underside;
   a seal structure pressing against each of the two longitudinally extending edges of the underside for sealing against the escape of the thermal medium, each seal structure extending continuously along at least the temperature-controlled section; and
   a magnet structure embedded in each seal structure for attracting the underside of the belt toward the respective seal structure.

* * * * *